Figure 1:
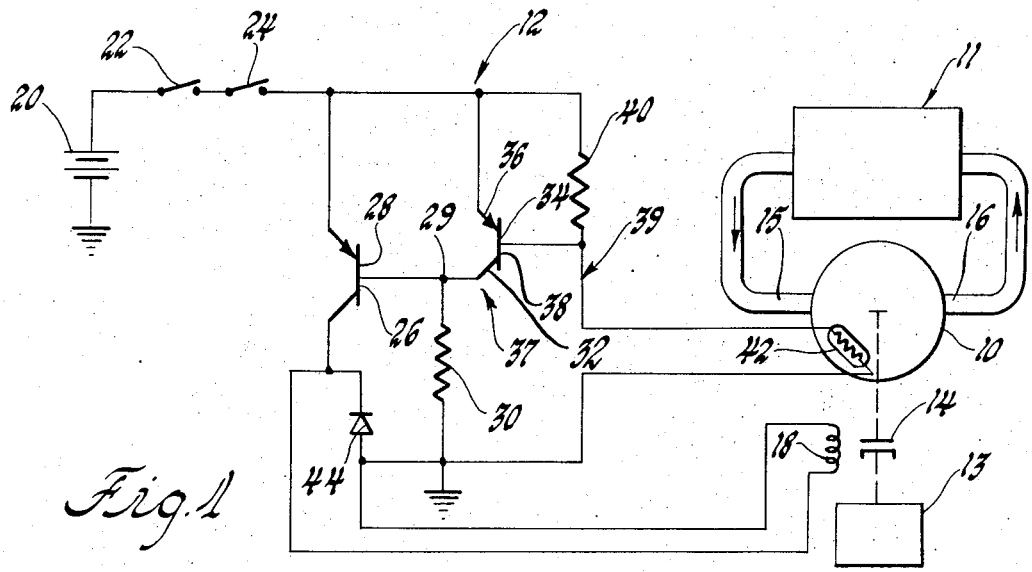

United States Patent
Ciolli

[15] 3,702,064
[45] Nov. 7, 1972

[54] AIR CONDITIONING PUMP SHUTOFF
[72] Inventor: Henry J. Ciolli, Utica, Mich.
[73] Assignee: General Motors Corporation, Detroit, Mich.
[22] Filed: Aug. 5, 1071
[21] Appl. No.: 169,299

[52] U.S. Cl. ..........................62/158, 62/228, 62/323
[51] Int. Cl. ...............................................F25b 27/00
[58] Field of Search.........62/228, 323, 129, 158, 215, 62/77

[56] References Cited

UNITED STATES PATENTS

| 2,978,879 | 4/1961 | Heidorn | 62/323 |
| 2,981,076 | 4/1961 | Gaugler | 62/323 |
| 3,047,696 | 7/1962 | Heidorn | 62/323 |

Primary Examiner—Meyer Perlin
Attorney—J. L. Carpenter et al.

[57] ABSTRACT

Apparatus for automatically rendering a vehicle air conditioning system inoperable when the system coolant falls below a certain level. An avalanche thermistor in the air conditioner pump is immersed in the coolant as long as the coolant is above the certain level. When the coolant falls below the certain level it no longer cools the thermistor, which then changes from a high resistance to a low resistance. The decrease in thermistor resistance causes deenergization of a clutch coil that must be energized for the pump to be operable. In alternative embodiments the clutch coil is also prevented from being energized when the vehicle engine is inoperative.

3 Claims, 3 Drawing Figures

PATENTED NOV 7 1972  3,702,064

INVENTOR.
Henry J. Ciolli
BY Paul Fitzpatrick
ATTORNEY

AIR CONDITIONING PUMP SHUTOFF

This invention relates to fluid level sensing apparatus and, more particularly, to apparatus for detecting a low coolant level in a vehicle air conditioning system and for automatically rendering the air conditioning system inoperative in the event the coolant level remains below a certain level for a predetermined time while the air conditioning system is in operation.

Many modern motor vehicles include air conditioning systems to increase the comfort of the vehicle occupants. These air conditioning systems customarily employ a coolant such as Freon, (a trademark) which is circulated in a closed refrigerator system by a pump. The coolant in these systems not only serves the important function of a refrigerant but also serves as a heat transfer agent to remove heat generated within the pump, which keeps the temperature of the pump within normal operating limits.

Since the pump in these systems is customarily driven by a mechanical connection to the engine of a vehicle, usually by a belt drive, it has been a practice in the manufacture of air conditioning systems to provide a clutch for mechanically disengaging the pump mechanism of the pump from the vehicle engine in order to limit operation of the pump to those times during which the vehicle occupants have need of the air conditioning afforded by the system. It has been customary to employ electric clutches for this purpose as they may conveniently be switch controlled. The operation of these electric clutches is typically controlled by controlling the energization of a winding, sometimes referred to as a clutch coil, within the clutch. Accordingly, it is only when the clutch coil is energized that the clutch mechanically couples the pumping mechanism of the pump to the belt drive for allowing the pump to be driven by operation of the vehicle engine. However, it has been observed that if a loss of coolant from the normally closed air conditioning system occurs while the pump is in operation the resulting increase in the temperature of the pump may cause it to become damaged.

It is therefore an object of this invention to provide apparatus for detecting loss of coolant from an air conditioning system by monitoring the temperature at a certain point within the air conditioning pump and for automatically preventing the pump from subsequent operation when such a coolant loss occurs.

It is also an object of this invention to provide apparatus for sampling a temperature within an air conditioning system pump and for automatically preventing the pump from subsequent operation by preventing energization of a pump activating clutch coil in the event the sampled temperature exceeds the certain level.

It is another object of this invention to provide apparatus for controlling the operation of a motor vehicle air conditioning pump in response to operation of the vehicle engine such that the pump is rendered inoperable whenever the vehicle engine is not operating or when a temperature sampled within the pump exceeds a predetermined level indicative of a loss of coolant from the air conditioning system.

Figure 2:
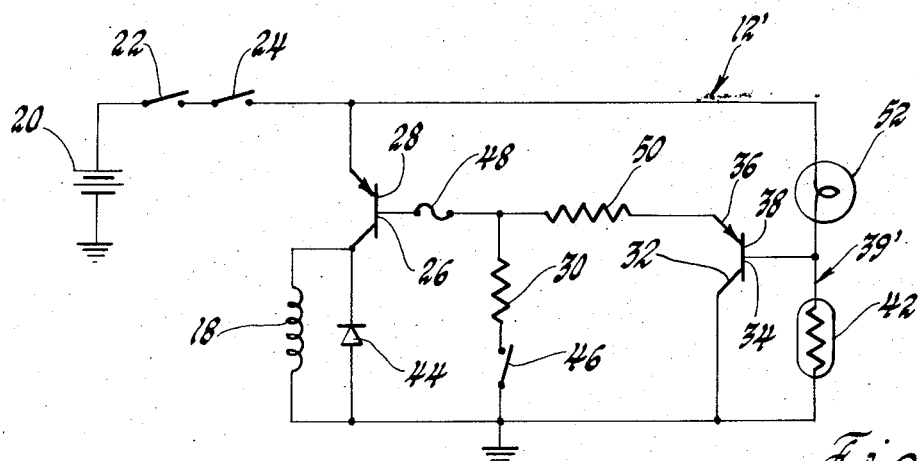
Figure 3:
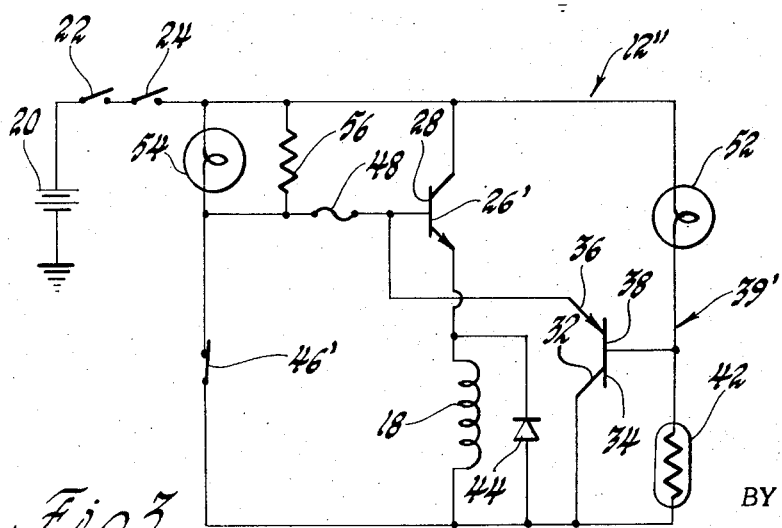

The foregoing and other objects and advantages of the subject invention will become apparent from the accompanying description and drawings, in which:

FIG. 1 is a schematic diagram of a control circuit embodying the principles of the subject invention; and FIGS. 2 and 3 are alternative embodiments of the control circuit of FIG. 1.

In FIG. 1 there is shown an air conditioning pump 10 in an air conditioning system 11 and a pump control circuit 12 for controlling the operation of the pump 10. While the structural details of the pump 10 and the air conditioning system 11 are not important for purposes of this description, it is contemplated that the pump 10 is mechanically driven by a vehicle engine 13 through an electric clutch 14 and when so driven circulates an air conditioning coolant, such as Freon, through a pair of conduits 15 and 16 to the remainder of the air conditioning system 11 within the vehicle. It is further contemplated according to the present invention that the clutch 14 is controlled by a clutch coil 18 that must be energized for the engine 13 to drive the pump 10 through the clutch 14. Accordingly, whenever the clutch coil 18 is energized the pump 10 is rendered operable and whenever it is deenergized the pump 10 is rendered inoperable.

In addition to the clutch coil 18 the pump control circuit 12 also includes a power source, such as a vehicle battery 20, for energizing the clutch coil 18 through an ignition switch 22, a manually operable switch 24, and a first transistor 26. All of the elements just recited are connected in a series circuit with the clutch coil 18 so as to preclude its energization unless each of them completes the current path they define.

Accordingly, the ignition switch 22, which may be of any well known configuration presently employed in motor vehicles, must be placed in a closed position for the clutch coil 18 to become energized. It is contemplated that closure of the ignition switch 22 is also required to energize other electrical loads (not shown) which must be energized for the vehicle to be operated. The clutch coil 18 is thus precluded from energization unless the switch 22 is placed in a setting which permits operation of the vehicle engine.

Similarly, the manually operable switch 24 must also be closed for the clutch coil 18 to become energized. The manually operable switch 24 is provided to permit the vehicle occupants to call for operation of the air conditioning system, which is done by closing the switch 24.

Energization of the clutch coil 18 is also controlled by the first transistor 26, which serves as a controlled switch in the current path and has a control mechanism in the form of its base 28, which is connected to a junction 29 between a resistor 30 and the collector 32 of a second transistor 34. The emitter 36 of the second transistor 34 is connected to the battery 20 through the switches 22 and 24 so the second transistor 34 and the resistor 30 form a voltage divider 37 which applies a potential to the base 28 of the first transistor 26 in accordance with the conductivity of the second transistor 34. The conductivity of the second transistor 34 is determined by the potential applied to its base 38 by a second voltage divider network 39, which includes a resistor 40 in series with an avalanche thermistor 42. By stating the thermistor 42 is an avalanche thermistor it is meant that it is of a type which has a very large resistance when cold and rapidly changes to a very low resistance as its temperature is increased past a certain critical temperature. Thermistors possessing these characteristics are typically made of silicon or other semiconductor materials and are well known and commercially available, though widely used only in recent years.

In the illustrated embodiments it is contemplated that the thermistor 42 is positioned within the pump 10 so as to be immersed in the coolant until the coolant level falls below a certain level. Accordingly, heat generated within the thermistor 42 by passage of current through the thermistor 42 is removed by the coolant passing across the thermistor 42. The thermistor 42 therefore remains below the critical temperature and in a high resistance condition until it is no longer cooled by the coolant, which may result from the coolant either falling below the certain level or ceasing to circulate while above the certain level, as will subsequently be explained. The thermistor 42 thus generates first and second resistance signals in accordance with the coolant level.

The pump control circuit 12 also includes a diode 44 for minimizing transients caused when the clutch coil 18 is deenergized, as will become apparent in the following operational description.

To operate the air conditioning pump 10, a vehicle occupant must place the ignition switch 22 in a setting in which the vehicle engine can operate and must also indicate that operation of the pump 10 is desired by closing the manually operable switch 24. When the switches 22 and 24 are closed they connect the battery 20 to the emitters of the transistors 26 and 34 and to voltage divider network 39, which includes the resistor 40 and the thermistor 42.

Since the thermistor 42 is normally cooled by the coolant its resistance is normally quite large compared with that of the resistor 40. The second voltage divider 39 applies to the base 38 of the second transistor 34 is therefore substantially the same as the voltage supplied by the battery 20. The second transistor 34, which is of a PNP type, is therefore normally biased to a nonconductive condition by the voltage divider 39. When the second transistor 34 is nonconductive it forms a large impedance relative to the resistor 30, in the first voltage divider 37. The first voltage divider 37 thus normally applies a certain potential, which approximates ground potential, to the base 28 of the first transistor 26. The first transistor 26, which is also of a PNP type, is therefore normally biased to a conductive condition so as to effect energization of the clutch coil 18 when the switches 22 and 24 are closed.

In the event the temperature of the thermistor 42 exceeds the certain critical temperature, which is normally due to the coolant within the pump 10 falling below the certain level, the resistance of the thermistor 42 is considerably decreased. The resulting decrease of the thermistor 42 resistance lowers the potential applied to the base 38 of the transistor 34 so as to bias the transistor 34 to a conductive condition. When the transistor 34 is made conductive the potential at the base 28 of the first transistor 26 is increased considerably due to the voltage divider action of the first voltage divider 37. The increased potential biases the first transistor 26 to a nonconductive condition so as to interrupt the current path through the clutch coil 18. Energy which is stored in the clutch coil 18 is dissipated through the diode 44 when the first transistor 26 is turned off, the diode 44 serving as what often is termed a "freewheeling" diode. The clutch coil 18 is thus deenergized so as to render the pump 10 inoperative when the temperature of the thermistor 42 has exceeded the certain critical temperature.

As previously mentioned, the most likely cause of the pump 10 internal temperature exceeding the certain temperature is a lowering of coolant level due to a leak in the air conditioning system 11. However, if the pump 10 is not being driven by the vehicle engine 13 after the switches 22 and 24 are closed it is possible that the heat generated by the current through the thermistor 42 and the clutch coil 18 may increase the temperature of the thermistor 42 above the critical temperature even though the thermistor 42 is immersed in the coolant. This may result because the coolant can't remove much heat from the thermistor 42 unless it is circulated. The heat buildup in the thermistor 42 could thus be due to the coolant not being circulated rather than a low coolant level. This would result in an erroneous indication of coolant level and may prevent operation of the pump 10 until one of the switches 22 and 24 is opened long enough for the thermistor 42 temperature to fall below the critical temperature. The control circuits 12' and 12'' in FIGS. 2 and 3 have been designed to prevent erroneous indications of coolant level such as this from occurring. In the circuits 12' and 12'' of FIGS. 2 and 3 it is contemplated that the thermistor 42 is in the pump 10 and the clutch coil 18 controls the pump 10 operativeness as previously described, but the air conditioning system 11 is not shown in these figures to simplify the drawings.

In the embodiment of FIG. 2, the control circuit 12 has been modified by the addition of an oil pressure responsive switch 46 that is responsive to oil pressure in the vehicle engine 13 and connected in series with the resistor 30. Other modifications include a time delay fuse 48 connected in series with the base 28 of the first transistor 26, a resistor 50 that connects the emitter 36 of the second transistor 34 to the fuse 48, and a lamp 52 that replaces the resistor 40.

The oil pressure switch 46, which is designed to be open when the vehicle engine is not in operation and closed when the engine is in operation, controls the potential applied to the base 28 of the first transistor 26 because the resistance of the resistor 30 is selected of such a value that the current drawn by the second transistor 34 can't render the first transistor 26 conductive. Accordingly, the oil pressure switch 46 prevents energization of the clutch coil 18 unless the vehicle engine 13 is actually in operation. The lamp 52 serves to indicate to the vehicle occupants when the clutch coil has been deenergized due to the thermistor 42 sensing a low coolant level, as will now be explained.

Upon closure of the switches 22 and 24 in the FIG. 2 embodiment the first transistor 26 interrupts the current path through the clutch coil 18 until a certain very low potential is applied to the base 28 of the first transistor 26, which can't occur so long as the oil pressure switch 46 is open. When the vehicle engine is placed in operation the engine oil pressure causes the oil pressure switch 46 to close, thus applying the certain potential to the base 28 through the fuse 48 and the resistor 30. The resistance of the resistor 30 is selected to be quite small and of such a value that the current drawn through the fuse 48 by the oil pressure switch 46 almost equals the current rating of the fuse 48. Since the thermistor 42 initially has a very high resistance the second transistor 34 remains nonconductive, as was described in connection with FIG. 1.

Should the thermistor 42 temperature exceed the certain temperature its decrease in resistance permits the lamp 52 to energize and causes the second voltage divider 39' to lower the voltage applied to the base 38 of the second transistor 34 sufficiently to turn on the second transistor 34. As the second transistor 34 is turned on it draws additional current through the fuse 48 and the resistor 50, which has a significantly larger resistance than the resistor 30. The total current drawn through the fuse 48 and the base 28 of the first transistor 26 by the oil pressure switch 46 and the second transistor 34 is sufficient to exceed the current rating of the fuse 48.

The values of the fuse 48 and other circuit elements are selected so the fuse 48 continues to conduct the excessive current for a predetermined time, after which time the current will blow the fuse 48 so as to turn off the first transistor by opening the circuit to its base 28. Since the temperature of the thermistor 42 may sometimes exceed the critical temperature due to the coolant level temporarily falling below the thermistor 42, the time delay characteristic of the fuse 48 enables the circuit 12' to accurately determine that a lasting low coolant level exists. After the predetermined time has elapsed and the fuse 48 has blown the first transistor 26 is made nonconductive so as to deenergize the clutch coil 18 and prevent the vehicle engine 13 from subsequently driving the pump 10 until the fuse 48 is replaced.

Since fuses such as the fuse 48 are blown as a result of internal heating it is apparent that current through the fuse 48 need only remain above the certain current level for a substantially uninterrupted period equivalent to the predetermined time. That is, a brief decrease in the current through the fuse 48 is of no substantial effect. For example, if sufficient coolant is splashed on the thermistor 42 to momentarily decrease its temperature below the critical temperature, even though the coolant is below the certain level, the second transistor 34 may momentarily be rendered nonconductive without substantially affecting the predetermined time.

As previously mentioned, when the thermistor 42 in the control circuit 12' of FIG. 2 changes to a low level it causes a voltage increase across the lamp 52 so as to energize the lamp 52 and advise the vehicle occupants of the low coolant level within the pump 10. While several commercially available lamps may be employed as the lamp 52 it has been observed that selecting the lamp 52 of an incandescent type which increases in resistance as it is energized affords additional current protection to the thermistor 42. This is because when avalanching occurs in the thermistor 42 the simultaneous increase in resistance of the lamp 52 limits the current through the thermistor 42.

Should the vehicle engine 13 be rendered inoperative while the pump 10 is in operation, the resultant decrease in the vehicle oil pressure will be sensed by the oil pressure switch 46, which then opens so as to substantially increase the potential applied to the base 28 of the first transistor 26. The resultant increase in the potential applied to the base 28 turns off the first transistor 26 so as to deenergize the clutch coil 18 and render the pump 10 inoperative. Since the resistor 50 resistance is much larger than that of the resistor 30 it is impossible to render the first transistor 26 conductive and energize the clutch coil 18 unless the oil pressure switch 46 is closed. This is an important advantage of the oil pressure switch 46 because if the clutch coil 18 were allowed to remain energized when the vehicle engine 13 is inoperative the resultant resistive heating due to the current through the clutch coil 18 may increase the internal temperature of the pump 10, and hence the temperature of the thermistor 42 within the pump 10, to a temperature higher than the certain temperature. Such could occur if the clutch 14 were placed within the pump 10 housing or in close proximity to the pump 10. This would cause the lamp 52 to become energized and provide the previously mentioned erroneous indication of the coolant level within the air conditioning system 11.

In the embodiment of FIG. 3, the control circuit 12' of FIG. 2 is modified by substituting an NPN transistor 26' for the first transistor 26 and a normally closed oil pressure switch 46' for the oil pressure switch 46. In addition, the control circuit 12'' of FIG. 3 also includes an oil pressure indicator lamp 54 and a resistor 56, both of which are connected in series with the oil pressure switch 46'. In the control circuit 12'' the emitter 36 of the second transistor 34 is connected directly to the base 28 of the first transistor 26'.

Upon closure of the switches 22 and 24 in the circuit 12'' the oil pressure switch 46' grounds the base 28 of the first transistor 26' through the fuse 48 and also grounds the oil pressure lamp 54, which becomes energized to indicate that the oil pressure is low and engine 13 is inoperative. Since the base 28 of the first transistor 26' is grounded the first transistor 26' remains nonconductive so as to keep the clutch coil 18 deenergized and the pump 10 inoperative.

When the vehicle engine is started the oil pressure switch 46' is opened so as to deenergize the oil pressure lamp 54 and allow the application of a certain bias potential from the battery 20 through the resistor 56 and the fuse 28 to the base 28 of the first transistor 26'. The certain bias potential turns on the first transistor 26' so as to energize the clutch coil 18 and render the pump 10 inoperative. So long as the temperature sensed by the thermistor 42 within the pump 10 remains below the certain temperature the clutch coil 18 remains energized.

Should the thermistor 42 temperature exceed the certain temperature it turns on the second transistor 34 in the manner previously explained so as to draw additional current from the battery 20 through the resistor 56 and the fuse 48. Since the total current drawn by the transistors 26' and 34 through the fuse 48 when both of the transistors 26' and 34 are conductive exceeds the current rating of the fuse 48, the fuse 48 will blow after the predetermined time has elapsed. When the fuse 48 has blown the base current to the first transistor 26' is interrupted so as to render it nonconductive and deenergize the clutch coil 18, rendering the pump 10 inoperative.

Though the foregoing description has been directed toward only the illustrated embodiments, persons versed in the art will appreciate that various other embodiments of the subject invention may be devised without departing from its spirit.

What is claimed is:

1. In an engine driven motor vehicle, apparatus for detecting an overheating condition in an air conditioning system having a fluid coolant and a pump for circulating the coolant comprising, in combination, a device defining a controlled current path and having a control mechanism therefor, application of a first voltage to the control mechanism causing the device to interrupt the current path and application of a second voltage to the control mechanism causing the device to complete the current path, a clutch coil connected in series with the controlled path and effective when energized to render the pump operable for circulating the coolant, means for connecting the device and the coil to a power source, a temperature responsive sensor having a first impedance when below a certain temperature and a second impedance when above the certain temperature positioned in the system so as to be immersed in the coolant when the coolant level in the system is greater than a certain level and not to be immersed in the coolant when the coolant level in the system is less than the certain level, circulation of the coolant when the sensor is immersed therein providing cooling of the sensor below the certain temperature, means responsive to the sensor impedance for applying a voltage to the control mechanism in response to the sensor impedance, said means applying the second voltage to the control mechanism when the sensor is of the first impedance and applying the first voltage to the control mechanism when the sensor is of the second impedance, and transient suppression means for dissipating energy stored in the coil when the said device interrupts the current path.

2. Low fluid detecting apparatus for detecting low levels of a pump circulated coolant in an air conditioning system of an engine driven motor vehicle comprising, in combination, a clutch coil this is effective when energized to render the pump operable for circulation of the coolant, a device defining a controlled current path and having a control mechanism therefor, the device being effective on application of a certain potential to the control mechanism to complete the current path and being effective on application of another potential to the control mechanism to interrupt said current path, means for connecting the coil in series circuit with said current path and a power source so as to effect energization of the coil by the power source only when said current path is completed by said device, engine responsive means responsive to operation of the vehicle engine for applying the certain potential to the control mechanism when the engine is in operation and for applying said other potential to the control mechanism when the engine is not in operation, a fluid level sensor responsive to the coolant level in the system for generating a first signal when the coolant level is above a certain level and a second signal when the coolant level is below the certain level, and time delay means responsive both to said engine responsive means and to said fluid level sensor generated signals for controlling the application of the certain potential to the control mechanism by the engine responsive means, the time delay means permitting the application of the certain potential to the control mechanism until the second signal has been generated by the fluid level sensor in a substantially uninterrupted manner for a predetermined time while the certain potential is applied to the control mechanism and thereafter precluding application of the certain potential to the control mechanism.

3. Apparatus for detecting low levels of a pump circulated coolant in a vehicle air conditioning system comprising, in combination, a clutch coil that is effective when energized to render the pump operable and effective when deenergized to preclude operation of the pump; means defining a controlled current path in series with the coil, said means having a control mechanism and being effective on application of a certain potential to the control mechanism to complete the current path and on application of another potential to the control mechanism to interrupt the current path; means for connecting a power source in series with the current path effective to energize the coil when the current path is complete and to deenergize the coil when the current path is interrupted; means responsive to operation of the engine for applying a certain potential to the control mechanism when the engine is in operation and for applying said other potential to the control mechanism when the engine is not in operation, thereby precluding energization of the coil unless the engine is in operation; a current responsive device connecting said engine responsive means to the control mechanism, said current responsive device being characterized as having a very low impedance until the current therethrough has exceeded a certain current level for a substantially uninterrupted predetermined time and thereafter having a very high impedance, current drawn by the control mechanism through the current responsive device being below the certain current level; coolant responsive means for generating a first signal when the coolant level is above a certain level and a second signal when the coolant level is below a certain level; and means responsive to the signals generated by the coolant level responsive means for drawing additional current through the current responsive device when the second signal is generated whereby the combined currents drawn through the current responsive device by the control mechanism and said last recited means exceed the certain current level so as to effect a change of the current responsive device impedance from a low to a high value, thereby preventing application of the certain potential to the control mechanism so as to prevent energization of the coil and operation of the pump when the coolant level has remained below the certain level for the predetermined time.

* * * * *